Nov. 25, 1958   R. H. DIERSTEIN ET AL   2,862,045
BUSHING SUPPORT FOR ELECTRICAL APPARATUS
Filed Feb. 27, 1957
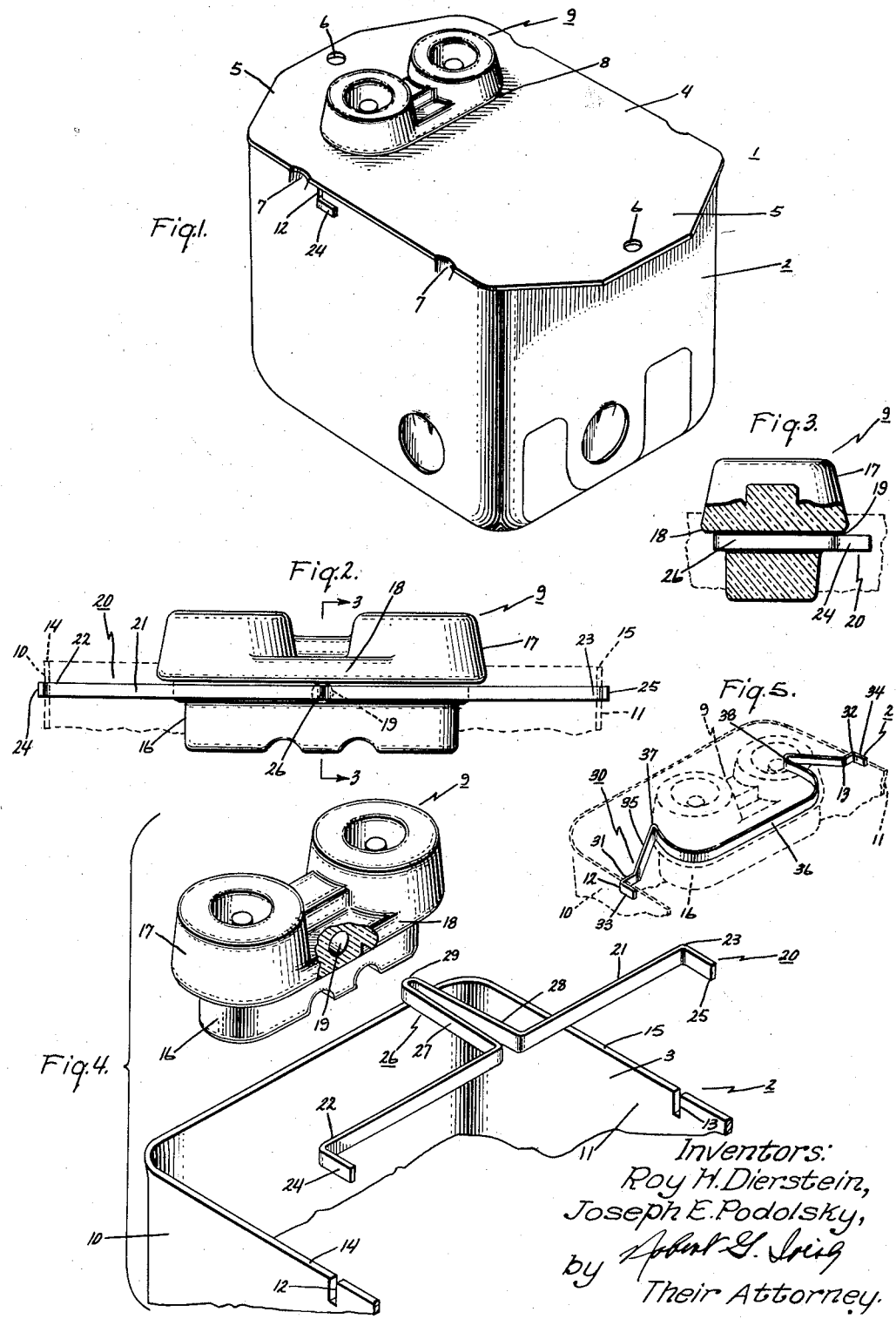
Inventors:
Roy H. Dierstein,
Joseph E. Podolsky,
by
Their Attorney.

United States Patent Office 2,862,045
Patented Nov. 25, 1958

2,862,045

BUSHING SUPPORT FOR ELECTRICAL APPARATUS

Roy H. Dierstein, Fort Wayne, Ind., and Joseph E. Podolsky, Youngstown, Ohio, assignors to General Electric Company, a corporation of New York Application February 27, 1957, Serial No. 642,798

5 Claims. (Cl. 174—152)

This invention relates to electrical apparatus of the type having an enclosing case and a bushing for making external electrical connections to the apparatus and more particularly to an improved support for the bushing in such apparatus.

Certain electrical apparatus, such as ignition transformers for oil burners, includes an enclosing case and a high voltage electrical bushing for making external high voltage electrical connections to the apparatus; in the case of an ignition transformer, the bushing serves to connect the high voltage secondary winding of the transformer to the oil burner electrodes. In the design of ignition transformers, it has been the practice in the past to support the bushing in the open end of the case by means of a generally U-shaped bracket member which spans the open end of the case and is attached to the opposite side walls thereof by screws, the bushing being retained in the bracket by means of a retaining pin. A cover or base member closes the open end of the case and has an opening therein through which the bushing projects.

The assembly of the prior bushing in the bushing support bracket and the bracket in the case involved an appreciable amount of hand labor and thus added to the overall cost of the apparatus. It is therefore desirable to provide an arrangement in which the bushing support bracket can be positioned readily and held in assembled relation without the use of screws or other auxiliary fastening devices and further in which the bushing is held in assembled relation on the bushing support bracket without requiring the use of retaining devices such as pins, thus reducing the cost of material and assembly of the apparatus.

An improved bushing support arrangement for electrical apparatus which eliminates auxiliary fastening and retaining devices is disclosed in co-pending application Serial No. 642,796 filed February 27, 1957, of Roy H. Dierstein and Harry J. Proxmire and assigned to the assignee of the present application. In the specific embodiment of that application, a casing member for electrical apparatus is provided having an open end with opposite side walls having a pair of transversely aligned openings respectively formed therein. A bushing support bracket member is provided having a first portion with an opening formed therein and a pair of spaced apart portions depending therefrom and generally perpendicular thereto, each of the pair of portions having an extension formed on its side edge. A bushing is provided having a lower portion and a larger upper portion defining a rim. The lower portion of the bushing is seated in the opening in the first portion bracket member with the rim abutting the surface thereof. In order to retain the bushing in the bracket member opening, peripherial slots are formed in the lower portion of the bushing which are engaged by spring tabs formed from the first portion of the bracket member adjacent the opening therein. The bracket is then positioned with the extensions on the depending portions respectively seated in the side wall openings so that cantilever support of the bushing in the open end of the casing is provided.

While the construction of the aforesaid Dierstein and Proxmire application eliminates completely the use of all auxiliary fastening and retaining devices, we have provided an improved bushing support arrangement which incorporates all of the desirable features of the Dierstein and Proxmire construction in an arrangement which utilizes considerably less material and is even more readily assembled. Our construction further utilizes a bushing of the type used in prior constructions rather than a modified bushing as required by the Dierstein and Proxmire construction.

It is therefore an object of this invention to provide an improved bushing support arrangement for electrical apparatus which eliminates the use of auxiliary fastening and retaining devices and which is simpler and incorporates less material than prior constructions.

Another object of this invention is to provide an improved bushing support arrangement for electrical apparatus which incorporates the desirable features set forth above.

Further objects and advantages of this invention will become apparent by reference to the following description and the accompanying drawing, and the features of novelty which characterize this invention will be pointed out with particularity in the claims annexed to and forming a part of this specification.

This invention in one aspect thereof provides a casing member for electrical apparatus having an open end with opposite side walls thereof having a pair of transversely aligned openings respectively formed therein. An electrical bushing for making external electrical connections to the apparatus is provided together with a bushing support bracket member formed of a strip of sheet material. The strip is positioned spanning the opposite side walls of the case and generally perpendicular to the edges thereof with its end respectively seated in the side wall openings. The strip has a portion intermediate its ends which engages the bushing and provides cantilever support therefor in the open end of the casing member.

In the drawing,

Fig. 1 is a view in perspective of a complete oil burner ignition transformer incorporating the improved bushing support arrangement of this invention, with the base assembled on the case;

Fig. 2 is a fragmentary side view of the improved bushing support arrangement of this invention;

Fig. 3 is a cross sectional view taken along the line 3-3 in Fig. 2;

Fig. 4 is a fragmentary exploded view further illustrating the improved bushing support arrangement of this invention; and Fig. 5 is a fragmentary view in perspective illustrating a modified form of the improved bushing support arrangement of this invention.

Referring now to Figs. 1 through 4 of the drawing, there is shown an oil burner ignition transformer 1 having an enclosing casing member 2. Casing member 2 has an open end 3 which is closed by a cover or base member 4. The base member 4 has suitable projections or feet 5 extending from each end with suitable mounting holes 6 formed therein. Base 4 may be secured to casing member 2 in any suitable manner, as for example, by crimping in several locations as at 7. Base member 4 further has an opening 8 formed therein through which high voltage electrical bushing 9 extends.

The opposite side walls 10 and 11 of casing member 2 have a pair of transversely aligned slots 12 and 13 respectively formed in their edges 14 and 15 and generally perpendicular thereto. A transformer core and coil assembly (not shown) is positioned within the casing member 2. The high voltage electrical bushing 9, which is provided for making suitable external electrical connections to the high voltage winding of the transformer by means of suitable electrical leads (also not shown) is formed of suitable material such as porcelain and has a lower portion 16 and an enlarged upper portion 17 defining a rim 18. A transverse opening 19 extends through the lower portion 16 immediately under rim 18. It will be understood that specific form and configuration of the bushing 9 does not constitute a part of this invention and is here shown for illustrative purposes only.

In order to support the bushing 9 in the open end 3 of casing member 2, a bushing support bracket member 20 is provided formed of a relatively narrow and thin strip 21 of sheet spring metal, such as A. I. S. I. 1045. The strip 21 is positioned spanning the side walls 10 and 11 of casing member 2 and generally perpendicular to the edges 14 and 15 with its end portions 22 and 23 respectively seated in slots 12 and 13. The outer extremities or ends 24 and 25 of strip 21 are further bent over respectively to engage the outer surfaces of side walls 10 and 11. Strip 21 has a generally U-shaped projection 26 formed therefrom substantially midway between its end portions 22 and 23, it being observed in Fig. 4 that prior to the assembly of bushing 9 thereon, the ends of the legs 27 and 28 of projection 26 adjacent their junction with the remainder of strip 21 are farther apart than are their ends adjacent bight portion 29. This preassembled configuration of projection 26 provides the resilient engagement with the opening 19 of bushing 9 as will now be described. Bushing 9 is arranged with projection 26 seated in opening 19; this biases legs 27 and 28 of projection 26 more closely together so that they resiliently engage the wall of opening 19 thereby retaining bushing 9 on the projection 26. It will now be observed that the bushing support bracket member 20 provides cantilever support for bushing 9 in the open end 3 of the casing member 2 without the use of screws or other auxiliary fastening and retaining devices. It will be further observed that the bushing support bracket member 20 is formed of a single strip of spring material which lends itself readily to formation on commonly available wire bending machinery. The assembly is completed by the base member 4 which retains the bushing support bracket member 20 in position. It will be observed that the bushing 9 can be very readily pushed into position on the spring projection 26 of strip 21 and is retained in assembled position by the resilient engagement therewith.

Referring now to Fig. 5 in which like parts are indicated by like reference numerals, the side walls 10 and 11 of casing member 2 again have generally perpendicular slots 12 and 13 formed in edges 14 and 15 respectively. Here, bushing support bracket member 30 is again formed of a relatively narrow and thin strip of spring sheet metal and is positioned spanning side walls 10 and 11 with its end portions 31 and 32 respectively seated in slots 12 and 13 and its end extremities 33 and 34 bent over to engage the outer surfaces of side walls 10 and 11. Here, however, the strip 35 which forms bushing support bracket member 30 has a portion 36 intermediate its end portions 31 and 32 formed resiliently to embrace a portion of the periphery of lower portion 16 of bushing 9. Portion 36 of strip 35 conforms substantially to a portion of the periphery of portion 16 of bushing 9 and it will be observed that the knees 37 and 38 are more closely spaced apart than the extreme axial dimensions of portion 16 of bushing 9 thereby providing the resilient engagement of portion 36 with the bushing 9; bushing 9 can be readily snapped into assembled position on portion 36 since knees 37 and 38 will be resiliently biased apart to pass lower portion 16 of bushing 9 and thereafter snap back resiliently to engage the same. It will be observed that with the construction of Fig. 5, no opening of any sort is required in the bushing 9 in order to retain it in the bushing support bracket.

It will now be readily seen that with the improved arrangement of this application, the same type of bushing used in prior construction, in which a separate retaining pin was used to hold the bushing and bushing support bracket may be utilized and thus no change in tooling for the bushing is necessitated by this construction. It will further be readily apparent that as in the case of the aforementioned Dierstein and Proxmire application, no auxiliary fastening devices are required to hold the bushing support bracket and the assembled bushing in the casing. Further, the bushing support bracket of this invention utilizes a bare minimum of material with absolutely no scrap being involved. It is thus seen that the bushing 9 may be assembled on the bushing support brackets 20 or 30 of this invention and the resulting assembly positioned in the casing member 2 with a minimum of time consuming labor and the elimination of all auxiliary passing and holding devices thus effecting a substantial saving in overall cost which is in no way detrimental to the performance of the apparatus.

While we have illustrated and described specific embodiments of this invention, further modifications and improvements will occur to those skilled in the art and we desire therefore in the appended claims to cover all modifications which do not depart from the spirit and scope of this invention.

What we claim as new and desire to secure by Letters Patent of the United States is:

1. In electrical apparatus: a casing member having an open end with opposite side walls having a pair of transversely aligned openings respectively formed therein; an electrical bushing for making external electrical connections to said apparatus; and a bushing support bracket member formed of a single relatively narrow elongated strip of sheet material, said strip being positioned spanning said opposite side walls and generally perpendicular to the edges thereof with its ends respectively seated in said side wall openings, said strip being bent intermediate its ends to form a portion engaging said bushing and providing cantilever support therefor in said casing member open end.

2. In electrical apparatus: a casing member having an open end with opposite side walls having a pair of transversely aligned openings respectively formed therein; an electrical bushing for making external electrical connections to said apparatus, and having a transverse opening formed therein; and a bushing support bracket member formed of a single relatively narrow elongated strip of sheet material, said strip being positioned spanning said opposite side walls and generally perpendicular to the edges thereof with its ends respectively seated in said side wall openings, said strip being bent to form a generally U-shaped projection intermediate its ends, said U-shaped portion being seated in said bushing opening providing cantilever support for said bushing in said casing member open end.

3. In electrical apparatus: a casing member having an open end with opposite side walls having a pair of transversely aligned openings respectively formed therein; an electrical bushing for making external electrical connections to said apparatus; and a bushing support bracket member formed of a single relatively narrow elongated strip of sheet material, said strip being positioned spanning said opposite side walls and generally perpendicular to the edges thereof with its ends respectively seated in said side wall openings, said strip being bent intermediate its ends to form a portion resiliently embracing a portion of the periphery of said bushing and providing cantilever support therefor in said casing member open end.

4. In electrical apparatus: a casing member having an open end with opposite side walls having a pair of transversely aligned slots formed in and generally perpendicular to the edges thereof; an electrical bushing for making external electrical connections to said apparatus and having a transverse opening formed therein; and a bushing support bracket member formed of a single relatively narrow elongated strip of sheet spring metal, said strip being positioned spanning said opposite side walls and generally perpendicular to said edges with its ends respectively seated in said side wall slots, said ends of said strip being bent-over respectively to engage the outer surfaces of said opposite side walls, said strip being bent to form a generally U-shaped projection intermediate its ends, said U-shaped portion being seated in said bushing opening and resiliently engaging the wall thereof providing cantilever support for said bushing in said casing member open end.

5. In electrical apparatus: a casing member having an open end with opposite side walls having a pair of transversely aligned slots formed in and generally perpendicular to the edges thereof; an electrical bushing for making external electrical connections to said apparatus; and a bushing support bracket member formed of a single relatively narrow elongated strip of sheet spring metal, said strip being positioned spanning said opposite side walls and generally perpendicular to said edges with its ends respectively seated in said side wall slots, said ends of said strip being bent-over respectively to engage the outer surfaces of said opposite side walls, said strip being bent intermediate its ends to form a portion resiliently embracing a portion of the periphery of said bushing and providing cantilever support therefor in said casing member open end.

References Cited in the file of this patent
UNITED STATES PATENTS

| | | |
|---|---|---|
| 2,462,622 | Farrow | Feb. 22, 1949 |
| 2,798,271 | Flora | July 9, 1957 |